United States Patent [19]
Watanabe et al.

[11] 4,017,828
[45] Apr. 12, 1977

[54] REDUNDANCY SYSTEM FOR DATA COMMUNICATION

[75] Inventors: Kazutaka Watanabe; Misao Shimizu; Toshio Ogawa; Akihiro Sugawara; Kiyoharu Inou, all of Musashino, Japan

[73] Assignee: Yokogawa Electric Works, Ltd., Tokyo, Japan

[22] Filed: July 10, 1975

[21] Appl. No.: 594,799

[30] Foreign Application Priority Data

July 19, 1974 Japan .............................. 49-82903

[52] U.S. Cl. ................ 340/146.1 BE; 340/146.1 C
[51] Int. Cl.² .................... G08C 25/00; G06F 11/00
[58] Field of Search .......... 340/146.1 C, 146.1 BE, 340/146.1 AG; 235/153 AE

[56] References Cited
UNITED STATES PATENTS

| 2,932,005 | 4/1960 | Brightman | 340/146.1 BE |
| 3,161,732 | 12/1964 | Martin et al. | 340/146.1 BE |
| 3,253,259 | 5/1966 | Jacoby | 340/146.1 BE |
| 3,370,270 | 2/1968 | Cesaro | 340/146.1 BE |
| 3,409,875 | 11/1968 | Jager et al. | 340/146.1 BE |
| 3,445,811 | 5/1969 | Hashimoto et al. | 340/146.1 BE |
| 3,763,470 | 10/1973 | Beng et al. | 340/146.1 AG |
| 3,890,493 | 6/1975 | Burtness et al. | 235/153 AE |

Primary Examiner—Charles E. Atkinson
Attorney, Agent, or Firm—Parmelee, Johnson & Bollinger

[57] ABSTRACT

A redundancy system for data communications upon two duplicate communication channels, each having transmission and reception circuits, characterized by a switching circuit for selecting one of said two communication channels, a single error detection circuit for detecting an error in the signal transmitted, and a control circuit for the switching circuit arranged to cause said two communication channels to alternately transmit signals when both the channels are in normal operation, and to cause one of said two channels to be selected when the other fails. The two channels share the error detection circuit and the control circuit and can therefore be built at a reduced cost and operated efficiently. Since the two channels are regularly checked for errors, they are operated with increased reliability.

5 Claims, 2 Drawing Figures

MASTER ST.

SLAVE ST.

REDUNDANCY SYSTEM FOR DATA COMMUNICATION

BACKGROUND OF THE INVENTION

1. Field of the Invention

This invention relates to redundancy systems for data communications wherein two duplicate communication channels each having transmission and reception circuits are provided for reliability. Such redundancy systems frequently are used in process control arrangements to permit the controlled process to continue despite equipment breakdown.

2. Description of the Prior Art

Prior art techniques use various different redundancy systems to attain high-reliability data communications. Such redundancy systems typically are arranged either as parallel redundancy systems or as standby redundancy systems. The former is characterized in that the two duplicate systems are operated in parallel and when any discrepancy arises between data transmitted by the two systems, the failed side is isolated for services. In standby redundancy systems, one of the two systems serves as a standby for the other. Both such redundancy systems, however, are not fully satisfactory. The parallel redundancy system must have two complete pairs of control and error detection circuits, entailing a significant cost. In the standby redundancy system, a failure in the standby side remains undetected until the master side fails because the standby becomes active only in an emergency.

SUMMARY OF THE INVENTION

It is therefore an object of the invention to provide an improved redundancy system for data communications. It is a specific object of the invention to provide a redundancy system which uses a minimum of equipment and therefore can be constructed at less expense, and which maintains regular supervision of both duplicate components to promptly detect failures.

In a preferred embodiment of the invention to be described hereinbelow in detail, the redundancy system transmits data over two duplicate communication channels each having transmission and reception circuits. Switching means select either one of the two channels to transmit data, and the transmissions are monitored by an error detecting means which detects errors in the signal transmitted over either channel. The switching means is controlled by a means which causes the switching means to alternate signal transmissions over the two communication channels when the channels are in normal operation, and, when an error in one channel is detected, causes the switching means to select the other channel. Such an arrangement is advantageous because both channels are regularly tested for errors, and a single error detection and control means can serve both channels.

Other objects, aspects and advantages of the invention will be pointed out in, or apparent from, the following detailed description considered together with the following drawings.

DESCRIPTION OF THE PREFERRED EMBODIMENT

Figure 1:
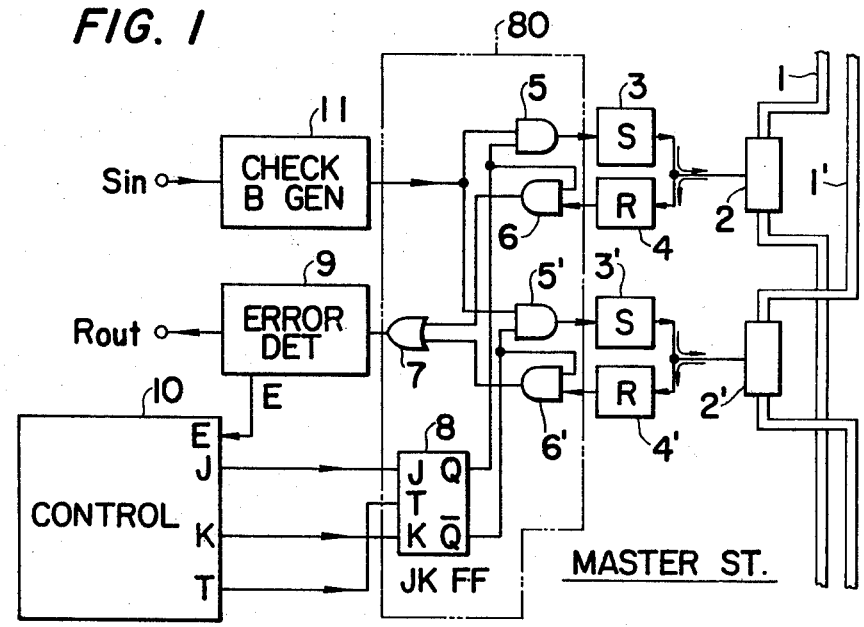
FIG. 1 is a block diagram showing a master data communications station embodying the redundancy system of the present invention.

FIG. 1 shows in block form a master data communications station constructed according to the invention and comprising duplicate transmission channels 1 and 1' having couplers 2 and 2', transmitters 3 and 3', and receivers 4 and 4'. The transmitters and receivers of the two channels are connected to a channel switching circuit 80 including AND gates 5 and 5', and 6 and 6', an OR gate 7, and a JK flip-flop 8. The channel switching circuit is in turn connected to an error detection circuit 9, a control circuit 10, and a check bit generator circuit 11.

A data signal to be transmitted from the master station is supplied to the check bit generator circuit 11 through the input or sending terminal Sin and branched to the AND gates 5 and 5' and thence to the transmitters 3 and 3'. Data signals received by the master station with receivers 4 and 4' go to the OR gate 7 through the AND gates 6 and 6'. The output of OR gate 7 is led to the output terminal Rout by way of the error detection circuit 9.

An error output E from the error detection circuit 9 is led to the terminal E of the control circuit 10, which is arranged to generate, in a manner described below, pulses J, K and T (trigger) for the JK flip-flop circuit 8. The AND gates 5 and 6 for communications channel 1 are enabled by the output Q of the JK flip-flop circuit 8, and the AND gates 5' and 6' for communications channel 1' are enables by the output $\overline{Q}$ of the JK flip-flop circuit 8.

Figure 2:
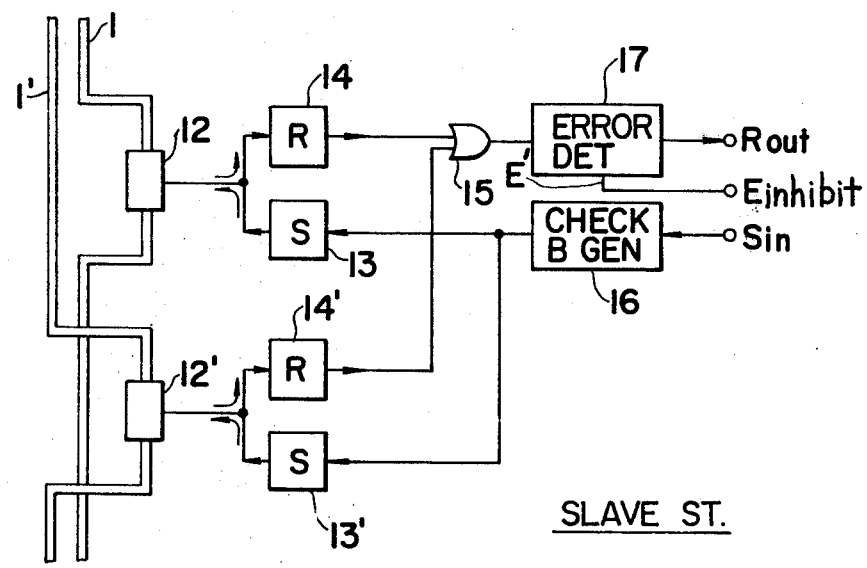
FIG. 2 is a block diagram showing a slave data communications station embodying the redundancy system of the present invention.

FIG. 2 shows in block form a slave data communications station constructed according to the invention and arranged to communicate with a master station as shown in FIG. 1. The slave station joins transmission channels 1 and 1' through couplers 12 and 12', transmitters 13 and 13', and receivers 14 and 14'. The slave station further comprises an OR gate 15, a check bit generator circuit 16, and an error detection circuit 17. A signal to be transmitted from the slave station to the master station is supplied to the check bit generator circuit 16 through the terminal Sin and branched to the transmitters 13 and 13'. The outputs of the receivers 14 and 14' are combined by way of the OR gate 15 and led to the output terminal Rout through the error detection circuit 17. The error detection output E' of the circuit 17 is led to the terminal E-inhibit and utilized with, e.g., an inhibiting gate, to inhibit the use of a received signal in which an error has been detected.

The redundancy system formed as illustrated in FIGS. 1 and 2 operates in the following manner. The master station initiates a communication by sending a transmission statement to the slave station, which is arranged to in turn send a return statement to be received by the master station, thus concluding one communication. While the two communication channels 1 and 1' and their transmission and reception circuits are in normal operation, the control circuit 10 of the master station is arranged to generate signals J = 1 and K = 1, and in addition is arranged to generate a clock pulse from the terminal T which precedes the start of each communication. This clock pulse triggers the flip-flop circuit 8 to generate 1 and 0 outputs alternately at its terminals Q and $\overline{Q}$, thereby enabling the AND gates 5 and 6, alternately with the AND gates 5' and 6'. Thus the two communications channels 1 and 1' are alternately used for communications, and have transmissions regularly checked for errors, eliminating possibilities of overlooking a failure developed in a standby system.

The circuit 9 detects an error in either communications channel 1 or 1' when it fails. Upon detection of an error, the normal channel is chosen by control circuit 10 to remain in operation by selecting the outputs (J, K) = (1, 0) or (J, K) = (0, 1) to be sent to the flip-flop 8, and the failed channel concurrently is isolated for repair. The control circuit 10 can easily determine the channel to select for continued operation, as it is always the other one from the channel in which the error is detected. Hence the redundancy system of the present invention does not need two error detection circuits and two control circuits as required in prior art parallel redundancy systems.

As described, one of the two alternative channels is selected by the master station, and the slave station operates on whichever channel is selected. Thus, if transmitter 3 generates a signal upon channel 1 and transmitter 3' generates no signal upon channel 1', then, in the slave station, an output will appear only at the receiver 14 and not at the receiver 14'. Before reaching output terminal R, however, the output of the receiver 14 goes to the error detection circuit 17 through the OR gate 15. When a transmission statement from the master station is received correctly by the slave station, a return statement is supplied to the transmission input terminal Sin of the slave station and thence to the transmitters 13 and 13' through the check bit generator circuit 16. If a failure takes place in the transmission channel between the master station and the slave station, the failure cannot be detected in the master station itself. However, if this happens, the error output E' of the error detection circuit 17 inhibits the slave station from performing a receiving operation, and thus no return transmission statement is supplied to the master station. Receiving no return statement, the master station becomes aware of the failure and selects the other channel for continued operation. Thus, for this type of error also, a single error detection circuit 17 suffices for the two channels.

For the sake of simplicity, FIG. 2 shows a circuit arrangement in which a return signal from the slave station is sent over both transmission channels 1 and 1' concurrently, with the appropriate channel being selected in the master station by the transmission channel switching circuit 80. If desired, the slave station can be arranged toa transmit over only one channel.

In the redundancy system of the present invention, errors in data transmission may be determined in any convenient fashion. For example, the concept of cyclic redundancy, or parity checks or other suitable means may be used to detect an error bit in transmitted data. In addition, in the disclosed embodiment, switching circuit 80 operates by inhibiting both input and output with gates 5 and 6 or 5' and 6' at the transmitter and receiver when either channel is selected. Channel selection also may be made by other suitable means such as with a channel selector switch or by disconnecting power to the transmitter and receiver.

If desired, error detection operations may be repeated several times in succession after a failure is initially detected on one channel. This will obviate switching from one channel to the other each time in response to a transient error bit such as may be ascribed to a channel noise, thus permitting the redundancy system to operate with stability and efficiency.

When a discrepancy is found existing between the two channels with respect to transmission delay or transmission quality when one system is switched to the other, a delay adjusting or level adjusting means may additionally be used to equilibrate the two systems.

While the master and slave stations have been described as separate entities, their elements may be incorporated into one station for the purpose of the invention.

As described above, two communications channels with transmission and reception circuits are operated alternately in the redundancy system of the present invention, to make it possible to quickly detect a failure on either side and to use one error detection circuit and one control circuit in common for the two systems, with the result that an efficient, economical redundancy system is realized.

Although one preferred embodiment of the invention and specific modifications thereof have been described herein in detail, it is to be understood that this is for the purpose of illustrating the invention, and should not be construed as limiting the scope of the invention, since numerous variations may occur to those skilled in the art without departing from the spirit of the invention.

We claim:

1. In a redundancy system for data communications between a master station and a slave station over two duplicate communication channels each capable of transmission and reception of signals to and from each of the master and slave stations, the slave station being arranged to transmit a responding signal to the master station upon receipt of each data transmission from the master station, the improvement which comprises:

switching means in the master station for selecting either one of said two communication channels to transmit data;

a first error detecting means in the master station for detecting an error in the signal transmitted by the slave station over the selected channel including an error corresponding to the absence of a responding transmission to the master station;

control means in the master station for said switching means, said control means causing said switching means to change channels following each data transmission when both channels are in normal operation, and, in response to an error detected by the error detection means, causing one of said two channels to be selected exclusively to transmit data when the other channel fails; and a second error detecting means in the slave station for detecting errors in transmitted signals from the master station over the selected communication channel and for generating a signal for inhibiting utilization by the slave station of said erroneously transmitted signals and for preventing a responding transmission by the slave station to the master station, whereby the first error detector means in the master station detects the presence of a transmission error noted by a slave station and causes the switching means to select one of the two channels exclusively to transmit data;

whereby the two channels are regularly tested during alternating data transmissions for errors, and a single error detection means in the master station can serve both channels and detect transmission errors in communications both to and from the master station over either channel.

2. A redundancy system for data communications as claimed in claim 1 wherein the switching means comprises a triggered flip-flop circuit for selecting between the two communication channels, and wherein the control means comprises means for triggering the flip flop circuit to cause it to change channels.

3. A redundancy system for data communication as claimed in claim 2 wherein the triggering means comprises a clock pulse circuit emitting a triggering pulse to the flip flop circuit between successive data transmissions.

4. A redundancy system for data communications as claimed in claim 2 wherein the switching means comprises means for applying the signals from the reception circuit of both channels to the single error detection means.

5. A method for redundantly communicating data between a master station and a slave station over two duplicate communication channels each capable of transmission to and from each of the master and slave stations, the slave station transmitting a responding signal to the master station upon receipt of each data transmission from the master station, and reception, comprising:

in the master station, alternately switching signal transmissions between the two channels following each data transmission when both channels are in normal operation;

in the master station, feeding received signals over the selected channel to a single error detecting means and detecting errors in the signal transmitted by the slave station over the selected channel including errors corresponding to the absence of a responding transmission to the master station;

in response to the detection at the master station of a transmission error in one channel, switching signal transmissions exclusively to the other channel;

in the slave station, detecting errors in the signal transmitted by the master station over the selected channel; and in response to the detection at the slave station of a transmission error from the master station, inhibiting utilization by the slave station of the erroneously transmitted signal and preventing a responding transmission by the slave station to the master station, whereby the master station detects the presence of a transmission error over one channel as noted by a slave station and switches data communications exclusively to the other channel;

whereby the two channels are regularly checked during alternating data transmissions for errors while providing redundancy capabilities, and a single means for detecting errors in the master station can serve both channels and detect transmission errors in communications both to and from the master station over either channel.

* * * * *